(12) United States Patent
Ichikawa et al.

(10) Patent No.: US 8,465,157 B2
(45) Date of Patent: Jun. 18, 2013

(54) PROJECTION TYPE IMAGE DISPLAY

(75) Inventors: Koshu Ichikawa, Yokohama (JP);
Hiroyuki Inoue, Fujisawa (JP);
Toshihiko Matsuzawa, Kamakura (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 464 days.

(21) Appl. No.: 12/781,001

(22) Filed: May 17, 2010

(65) Prior Publication Data

US 2010/0321643 A1  Dec. 23, 2010

(30) Foreign Application Priority Data

Jun. 18, 2009  (JP) .................................. 2009-144885
Jan. 21, 2010  (JP) .................................. 2010-010572

(51) Int. Cl.
*G03B 21/14* (2006.01)

(52) U.S. Cl.
USPC ........................................... 353/69; 248/599

(58) Field of Classification Search
USPC ................. 353/69, 70; 248/599–601
See application file for complete search history.

(56) References Cited

U.S. PATENT DOCUMENTS 7,901,091 B2 *  3/2011  Chen et al. ..................... 353/119

FOREIGN PATENT DOCUMENTS

| JP | 2006-227050 | | 8/2006 |
| JP | 2006-25925 | A * | 9/2006 |
| JP | 2006-330757 | | 12/2006 |

OTHER PUBLICATIONS

English Machine Translation of JP 2006-25925.*

* cited by examiner

*Primary Examiner* — Georgia Y Epps
*Assistant Examiner* — Jerry Brooks
(74) *Attorney, Agent, or Firm* — Antonelli, Terry, Stout & Kraus, LLP.

(57) ABSTRACT

A projection type image display apparatus for projecting optical fluxes from a light source onto a projection plane so as to display an image, provided with a reflection mirror arranged in such a manner that the reflection mirror interrupts an optical path of the projection light in the direct projection mode when the reflection mode is set and reflects the projection light to the backside of the projection type image display apparatus, and when the reflection mode is set, the projection type image display apparatus is tilted to the backside. The projection type image display apparatus is further provided with an adjustment leg arranged in a front portion of a bottom plane of the projection type image display apparatus and extended by a predetermined leg length, and thereby the projection type image display apparatus is tilted to the backside.

7 Claims, 11 Drawing Sheets

THE SPRING IS ENTERED INTO THE CYLINDER, SO THAT THE LENGTH OF THE ADJUSTMENT LEG CAN BE FURTHER ADJUSTED

A STATE IN WHICH THE CASE BOSS AND THE STOPPNIG SPRING ARE ABUTTING

FIG. 11C

A STATE IN WHICH THE STOPPING SPRING IS EMBEDDED IN THE CASE BOSS

FIG. 11B

A STATE IN WHICH THE CASE BOSS AND THE STOPPNIG SPRING ARE ABUTTING

FIG. 11D

A STATE IN WHICH THE STOPPING SPRING IS EMBEDDED IN THE CASE BOSS

PROJECTION TYPE IMAGE DISPLAY

CROSS REFERENCE TO RELATED APPLICATION

This application claims priority from Japanese Patent Application JP2009-144885 filed on Jun. 18, 2009 and JP 2010-010572 filed on Jan. 21, 2010, the content of which is hereby incorporated by reference into this application.

BACKGROUND OF THE INVENTION

The present invention generally relates to a projection type image display apparatus for projecting an image of an image display element on a projection plane such as a screen by enlarging the image so as to display the image. More specifically, the present invention is directed to a projection type image display apparatus in which the projection distance between a screen and the projection type image display apparatus is short.

Various sorts of projection type image display apparatuses have already and practically been utilized by which images of image display elements are displayed on screens (projection planes) in enlarge modes via projection optical units constructed by employing a plurality of lenses.

Since these projection type image display apparatus display images by projecting light of images on screens, these projection type image display apparatuses are suitable for display images on large-sized screens. Also, since projection type image display apparatuses need not be connected to screens by cables, there is such a feature that degrees of freedom for setting the image display apparatus become high. However, although the setting degrees of freedom are high, directions of projection light are required to be adjusted. Generally speaking, directional adjustments of the projection light are carried out by screwing screw-type legs which are provided on bottom portions of projection type image display apparatuses.

For instance, JP-A-2006-330757 has disclosed a projection type image display apparatus, tilts and heights of which are adjusted by legs equipped with first adjusting means and second adjusting means. The first adjusting means adjusts projection amounts of the legs in a stepwise manner, and the second adjusting means adjusts the projection amounts of the legs in the arbitrary manner. Further, JP-A-2006-227050 has disclosed a technical idea that the lens cover provided on the tip of a projection lens is employed as the leg of the projector and the tilt mechanism thereof.

SUMMARY OF THE INVENTION

If distance (projection distance) between projection type image display apparatuses and a screen becomes short, then a front area of the screen is blocked up by the projection type image display apparatuses. As a result, there is such a problem that user friendly characteristics of the projection type image display apparatus is deteriorated. So, a solving method can be considered that image projection light may be projected from oblique directions with respect to screens so as to cause the front area of the screen to become empty. However, if an incident angle of image projection light with respect to the screen is increased, then a trapezoidal distortion may be generated in the image projected on the screen. In order to solve the above-described trapezoidal distortion, there is another problem that costs of projection optical units of the projection type image display apparatus are increased.

An object of the present invention is to solve the above-described problems, and is to provide a projection type image display apparatus, the projection distance of which is short, while the cost of a projection optical unit employed in the projection type image display apparatus is not largely increased.

Also, another object of the present invention is to provide a projection type image display apparatus in which adjustable width of the projection distance is large.

To solve the above-described problems, a projection type image display apparatus for projecting optical fluxes from a light source on a projection plane so as to display thereon an image, according to the present invention, is featured by that in a projection type image display apparatus for projecting optical fluxes from a light source onto a projection plane so as to display an image thereon, the projection type image display apparatus has a direct projection mode for projecting projection light ahead of the projection type image display apparatus and a reflection mode for projecting projection light to a backside of the projection type image display apparatus; the projection type image display apparatus is comprised of a reflection mirror which is arranged in such a manner that the reflection mirror interrupts an optical path of the projection light in the direct projection mode when the reflection mode is set and reflects the projection light to the backside of the projection type image display apparatus, and when the reflection mode is set, the projection type image display apparatus is made to be tilted backward.

In addition, the projection type image display apparatus of the present invention is comprised of an adjustment leg arranged at a front portion of a bottom plane of the projection type image display apparatus, is extended by a predetermined leg length, and the projection type image display apparatus is made to be tilted backward by extending the adjustment leg.

In accordance with the present invention, the projection type image display apparatus without a large cost increase, the projection distance of which is short, can be provided, and at the same time, the projection type image display apparatus in which the adjusting width of the projection distance is large can be provided. As a result, the projection type image display apparatus whose setting degree of freedom is improved can be provided in low prices.

Other objects, features and advantages of the invention will become apparent from the following description of the embodiments of the invention taken in conjunction with the accompanying drawings.

DETAILED DESCRIPTION OF THE EMBODIMENTS

Now, referring to drawings, a detailed description will be made of various embodiment modes of the present invention.

Figure 1:
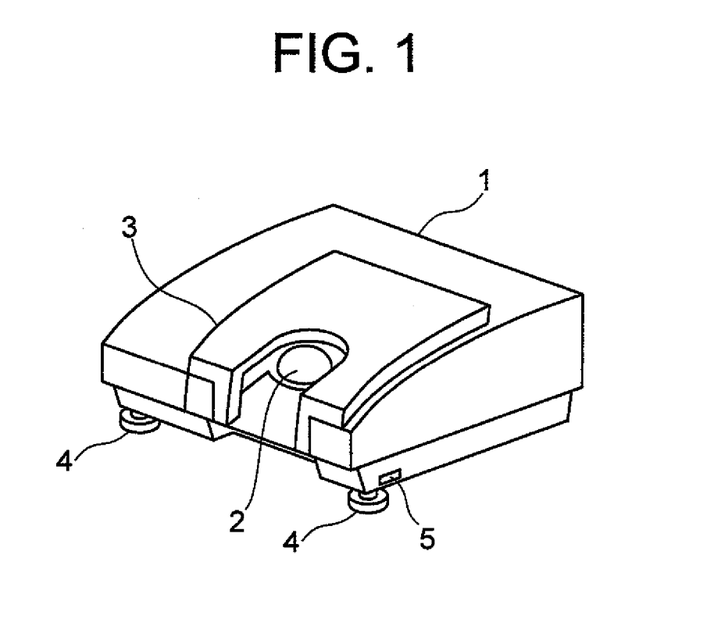
FIG. 1 is a view for illustrating the outline of a projection type image display apparatus according to Embodiment 1 of the present invention.

FIG. 1 is a view for illustrating the outline of a projection type image display apparatus 1 which is described in Embodiment 1 of the present invention. The projection type image display apparatus 1 projects projection light of images through a projection lens 2 onto a screen (not shown). In this case, no specific explanation is made, since constructions of an illumination optical system unit, a projection optical system unit, a light source, and an arrangement of a control circuit, which are employed in the projection type image display apparatus 1, may be realized by any method.

Although it will be described in detail later, the projection type image display apparatus 1 is equipped with a reflection mirror 3 which reflects the projection light which came through the projection lens 2 to a backside of the projection type image display apparatus 1.

In the case that the reflection mirror 3 projects the projection light ahead of the projection type image display apparatus 1 (namely, direct projection mode), this reflection mirror 3 is stored in the projection type image display apparatus 1. In the case that the reflection mirror 3 projects the projection light to the backside of the projection type image display apparatus 1 (namely, reflection mode), this reflection mirror 3 is raised in such a manner that the optical path of the direct projection mode is interrupted, and reflects the projection light through the projection lens 2 so as to project the projection light to the backside of the projection type image display apparatus 1.

The reflection mirror 1 of FIG. 1 is constructed in such a manner that the reflection mirror 1 is pivotally rotated around a front end portion of the projection type image display apparatus 1 as a center.

Adjustment legs 4 for adjusting projection directions of the projection light are provided on bottom portions of a front plane of the projection type image display apparatus 1, and leg lock release buttons 5 for adjusting leg lengths of the adjustment legs 4 are provided on side planes of the projection type image display apparatus 1. A detailed description will be made of detailed structures of the adjustment legs 4 in Embodiment 1.

Figure 2:
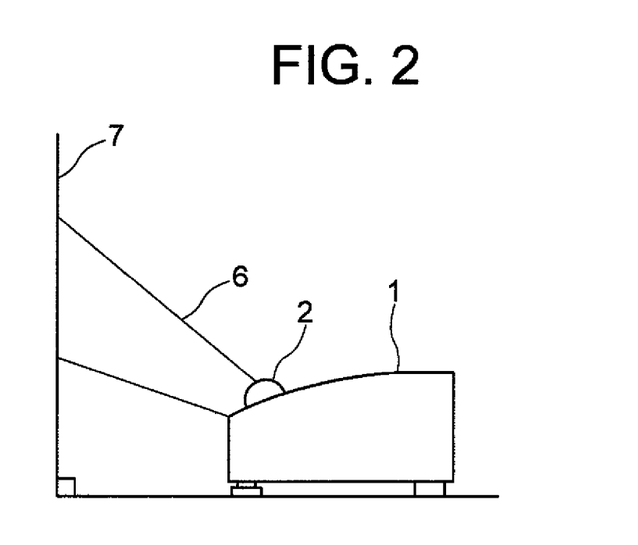
FIG. 2 is a view for illustrating an optical path of a direct protection mode.

Next, it will be described a relationship between optical paths of projection light and setting conditions of the projection type image display apparatus 1 with reference to FIG. 2 and FIG. 3. As previously described, the projection type image display apparatus 1 has two projection modes, namely the direct projection mode by which the projection light is projected ahead of the projection type image display apparatus 1, and the reflection mode by which the projection light is projected to the backside of the projection type image display apparatus 1. FIG. 2 represents an optical path of the direct projection mode, and FIG. 3 represents an optical path of the reflection mode.

In the direct projection mode of FIG. 2, projection light projected through the projection lens 2 of the projection type image display apparatus 1 horizontally settled on a setting plane is enlarged/projected as represented as an optical path 6, and then, the enlarged projection light is projected onto a projection plane (screen) 7 vertically provided on the setting plane. In the reflection mode of FIG. 3, the projection light projected through the projection lens 2 of the projection type image display apparatus 1 horizontally settled on a setting plane is reflected on the reflection mirror 3, and is enlarged/projected as represented as the optical path 6, and then, the enlarged projection light is projected on the projection plane (screen) 7 vertically provided on the setting plane. At this time, the adjustment legs 4 are extended, so that the projection type image display apparatus 1 is set at a tilt angle "θ".

Figure 3:
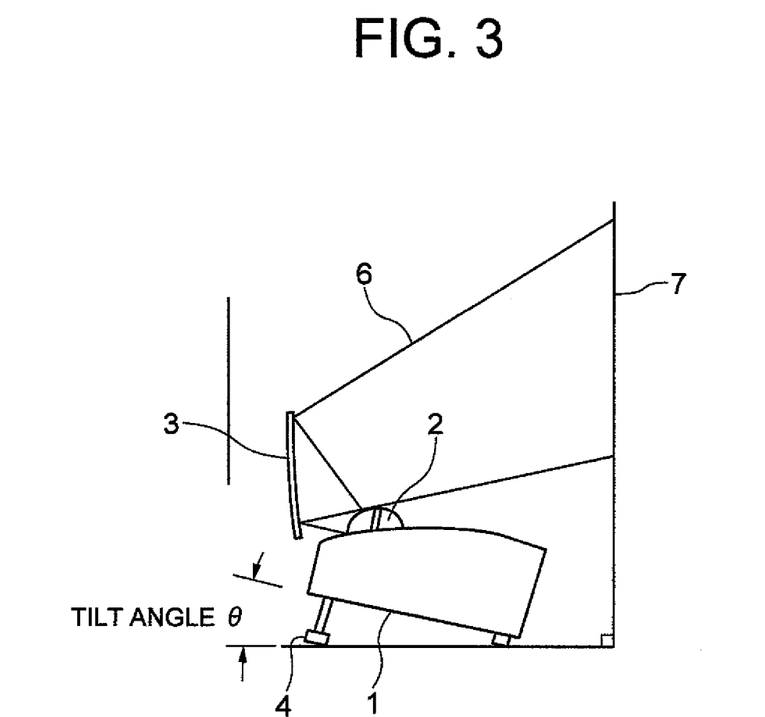
FIG. 3 is a view for illustrating an optical path of a reflection mode.

In the reflection mode shown in FIG. 3, a projection distance (namely, distance between projection type image display apparatus 1 and screen 7) nearly equal to a depth dimension of the projection type image display apparatus 1 can be made short, as compared with a projection distance of the direct projection mode indicated in FIG. 2. If the reflection mirror 3 is constructed by employing a mirror having a convex plane in a reflection direction, then a projection angle thereof is increased, so that the above-described projection distance may be further shortened.

Next, it will be described a relationship between the tilt angle and the optical paths when the reflection mode of the projection type image display apparatus 1 is set, with reference to FIG. 4 and FIG. 5.

Figure 4:
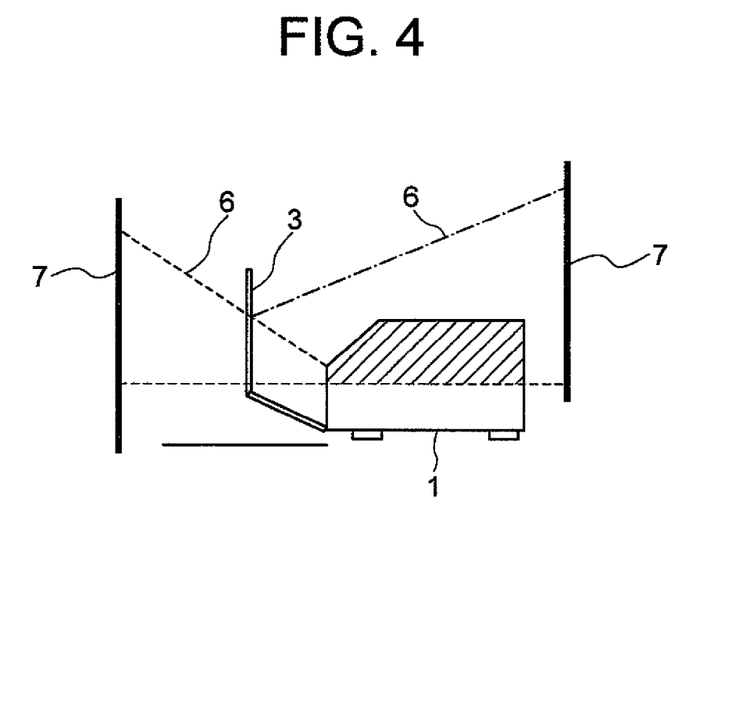
FIG. 4 is an explanatory view (90-degree reflection mirror) for illustrating a tilt of the projection type image display apparatus.

FIG. 4 represents an optical path 6 in the case that the reflection mirror 3 of the projection type image display apparatus 1 horizontally settled on the setting plane is raised at a right angle when the reflection mode is set. In FIG. 4, it is assumed that in the direct projection mode, projection light is projected from the horizontal direction of the projection type image display apparatus 1 at a predetermined projection angle, and thus, an optical path 6 is formed. In this case, if the reflection mirror 3 is raised at the right angle and the projection light is reflected, then the reflected projection light interferes with the projection type image display apparatus 1, so that the reflected projection light cannot be projected onto the projection plane (screen) 7 arranged in the backside of the projection type image display apparatus 1.

Figure 5:
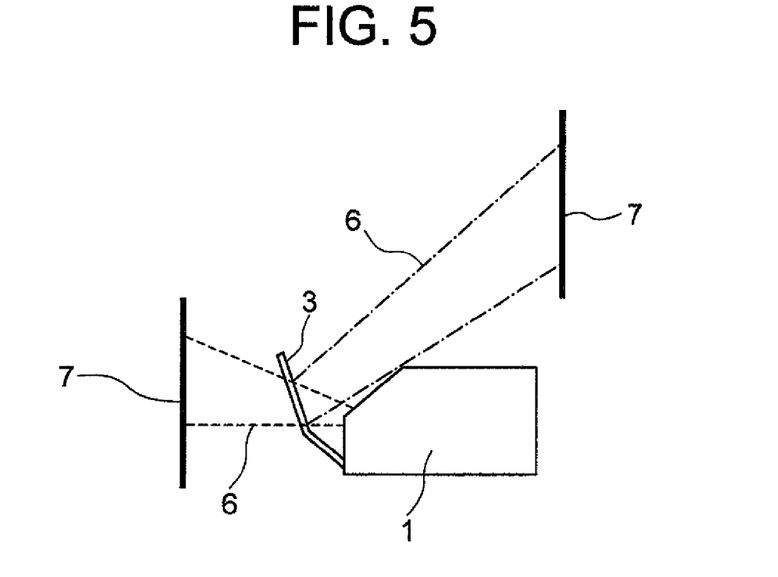
FIG. 5 is an explanatory view (tilting reflection mirror) for illustrating a tilt of the projection type image display apparatus.

As a consequence, as indicated in FIG. 5, if the reflection mirror 3 is raised at an angle larger than the right angle in order that the projection light does not interfere with the projection type image display apparatus 1 when the reflection mode is set, then an optical path 6 is formed as shown in FIG. 5, so that the reflected projection light is projected onto the projection plane (screen) 7. In this case, however, since an incident angle of the reflected projection light to the projection plane (screen) 7 becomes large, a trapezoidal distortion may occur, so that a distortion correction is required.

Although the projection light has been projected at the predetermined projection angle from the horizontal direction of the projection type image display apparatus 1 in FIG. 4 and FIG. 5, even in a case that the projection light is projected not from the horizontal direction but from a predetermined elevation angle, the incident angle thereof to the projection plane (screen) 7 in the reflection mode becomes large as compared with that of the direct projection mode, in order to prevent interference between the projection type image display apparatus 1 and the reflection light. As a result, a further trapezoidal distortion correction is required.

As previously described, since the trapezoidal distortion amount when the reflection mode is set becomes larger than that when the direct projection mode is set, there are some cases that projection optical system units of the projection type image display apparatus 1 can hardly be utilized in common. As a consequence, in accordance with the present invention, as shown in FIG. 3, when the projection type image display apparatus 1 is set in the reflection mode, this projection type image display apparatus 1 has the tilt angle "θ", so that the incident angle to the projection screen (screen) 7 is made similar to that of the direct projection mode. As a result, the projection optical system units can be utilized commonly in both the direct projection mode and the reflection projection mode of the projection type image display apparatus 1.

Embodiment 1

Next, a structure capable of achieving a tilt angle of the projection type image display apparatus 1 when the reflection mode is set will now be described more concretely.

Figure 6:
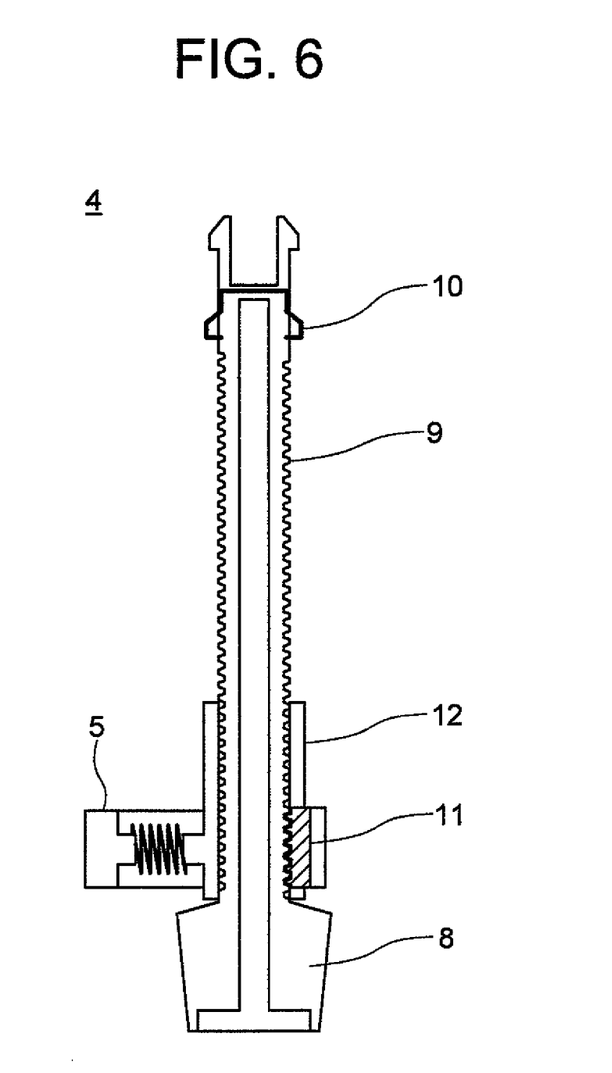
FIG. 6 is a view for illustrating a leg portion when stored according to Embodiment 1.
Figure 7:
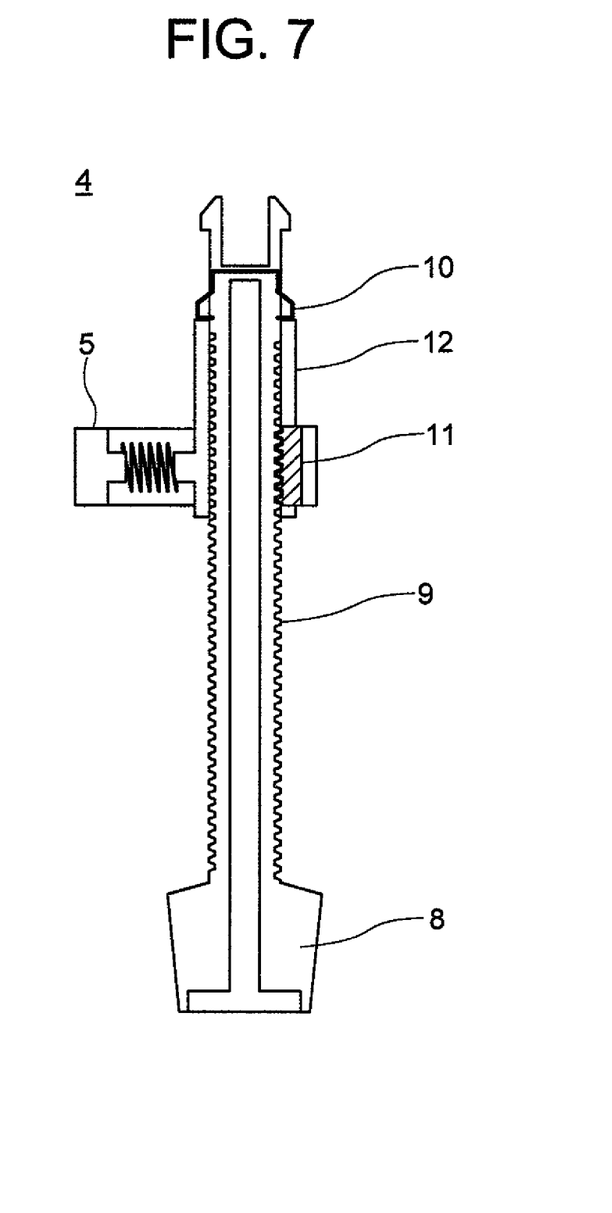
FIG. 7 is a view for illustrating a leg portion when extended according to Embodiment 1.
Figure 8:
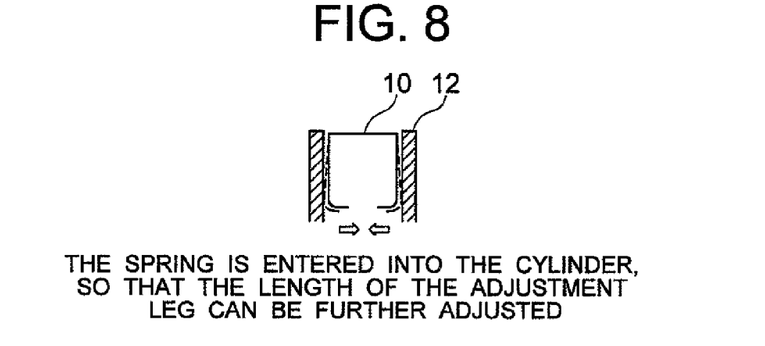
FIG. 8 is an enlarged view of a latching spring portion of Embodiment 1.

FIG. 6, FIG. 7 and FIG. 8 are views for illustrating the structure of the adjustment leg 4 of FIG. 1 in detail. Since the function of the adjustment leg 4 has already been described, the explanation thereof is omitted and the structure of the adjustment leg 4 will now be described.

The adjustment leg 4 is constructed by employing a leg portion 8 which is contacted to a setting plane of the bottom portion of the projection type image display apparatus 1; a shaft portion 9 having a screw groove; and a stopping spring 10 which is provided at an end portion located opposite to the leg portion 8 of the shaft portion 9. The adjustment leg 4 has been mounted on a case boss portion 12 in a slidable manner. The sliding operation of the shaft portion 9 is stopped by fitting the screw groove of the shaft portion 9 by a screw latching portion 11 provided in the case boss portion 12. The fitting of the screw latching portion 11 to the screw groove of the screw portion 9 is released by depressing a leg lock release button 5, and then, the adjustment leg 4 is slid over the case boss portion 12 by depressing the leg lock release button 5.

FIG. 6 is a view for showing a state that the adjustment leg 4 has been stored in an inner portion of the projection type image display apparatus 1. When the leg lock release button 5 is depressed under the above-described state, the fitting between the shaft portion 9 and the screw latching portion 11 is released, and then, the adjustment leg 4 is extended outside the projection type image display apparatus 1 due to a self-weight of the adjustment leg 4. By the extension of the adjustment leg 4, the projection type image display apparatus 1 achieves a tilt angle.

FIG. 7 is a view for showing a state that the adjustment leg 4 has been extended. The sliding of the adjustment leg 4 due to the self-weight thereof is stopped by that the stopping spring 10 having a U-shaped form abuts against the case boss portion 12. As previously described, the adjustment leg 4 can be extended without a stop due to the self-weight by depressing the leg lock release button 5, so that the projection type image display apparatus 1 can be easily tilted at the tilt angle.

In addition, since the screw groove is formed in the shaft portion 9 of the adjustment leg 4 and is fitted to the screw latching portion 11, the extension of the adjustment leg 4 can be adjusted finely by screwing the shaft portion 9, so that the tilt angle of the shaft portion 9 can be adjusted. Moreover, even under the state that the adjustment leg 4 is extended (see FIG. 7), the stopping spring 10 has the U-shaped form, so that, as shown in FIG. 8, an open end of this U-shaped form of the stopping spring 10 is deformed to be entered into an inner side of the case boss portion 12, enabling a fine adjustment of the extension of the adjustment leg 4.

Embodiment 2

Figure 9:
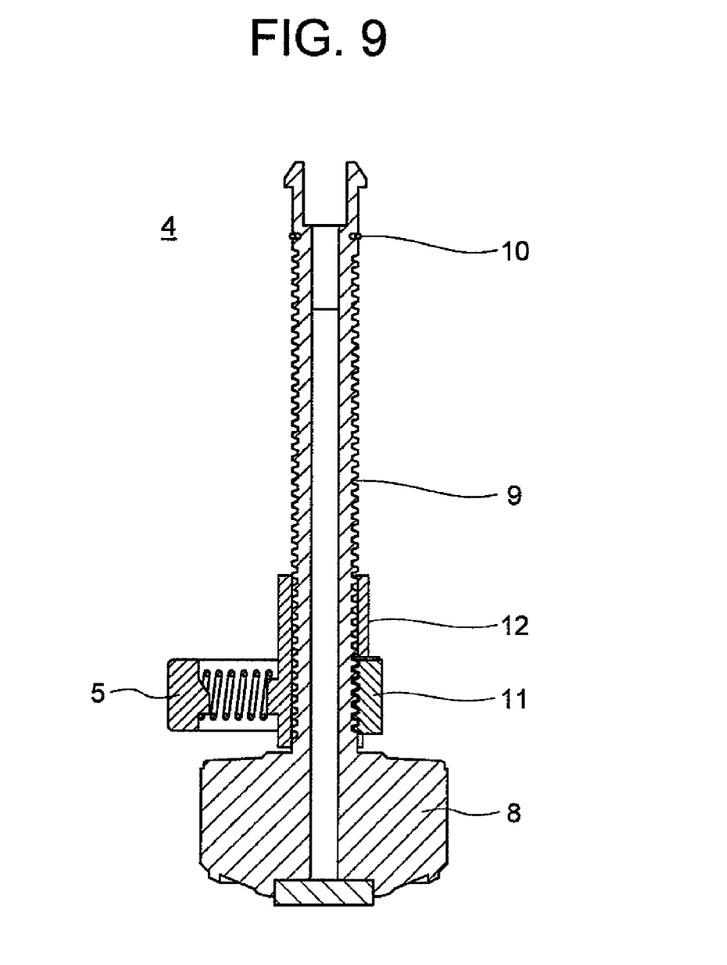
FIG. 9 is a view for illustrating a leg portion when stored according to Embodiment 2.
Figure 10:
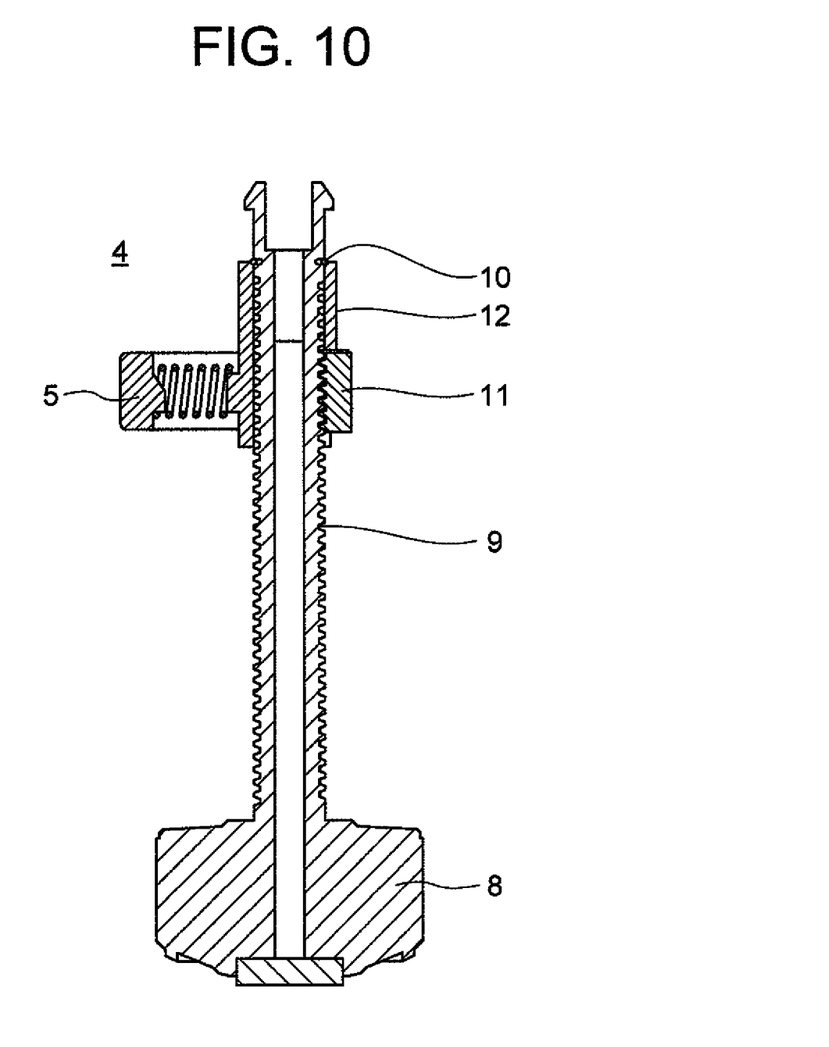
FIG. 10 is a view for illustrating a leg portion when extended according to Embodiment 2.

It will be described a structure capable of achieving a tilt angle of the projection type image display apparatus 1 when the reflection mode is set, as another embodiment (Embodiment 2) with reference to FIG. 9 and FIG. 10. FIG. 9, FIG. 10, and FIG. 11A to FIG. 11D are views of the structure of the adjustment leg 4 of FIG. 1 in detail. Since the function of the adjustment leg 4 is described as above, the explanation thereof is omitted, and the structure of the adjustment leg 4 will now be described.

It should be understood that this Embodiment 2 has a difference that a stopping spring 10 is different from that of the above-explained Embodiment 1.

The adjustment leg 4 is constructed by employing a leg portion 8 which is contacted to the setting plane of the bottom portion of the projection type image display apparatus 1, a shaft portion 9 having a screw groove, and a stopping spring 10 which is provided at an end portion located opposite to the leg portion 8 of the shaft portion 9. The adjustment leg 4 is mounted on the case boss portion 12 in a slidable manner. The sliding operation of the shaft portion 9 is stopped by fitting the screw groove of the shaft portion 9 by the screw latching portion 11 provided in the case boss portion 12. The fitting of the screw latching portion 11 to the screw groove of the screw portion 9 is released by depressing a leg lock release button 5, and then, the adjustment leg 4 is slid over the case boss portion 12 by depressing the leg lock release button 5.

FIG. 9 is a view for showing a state that the adjustment leg 4 is stored in the inner portion of the projection type image display apparatus 1. When the leg lock release button 5 is depressed under the above-described state, the fitting between the shaft portion 9 and the screw latching portion 11 is released, and then, the adjustment leg 4 is extended outside the projection type image display apparatus 1 due to the self-weight of the adjustment leg 4. By the extension of the adjustment leg 4, the projection type image display apparatus 1 achieves a tilt angle.

FIG. 10 is a sectional view for representing the adjustment leg 4, taken along a longitudinal axial direction of the adjustment leg 4 when the adjustment leg 4 is extended. The sliding of the adjustment leg 4 caused by the self-weight thereof is stopped by that the stopping spring 10 abuts against the case boss portion 12. As previously described, the adjustment leg 4 can be extended due to the self-weight without a stop by depressing the leg lock release button 5. Since the screw groove is formed in the shaft portion 9 of the adjustment leg 4 and is fitted to the screw latching portion 11, the extension of the adjustment leg 4 can be adjusted finely by screwing the shaft portion 9. As previously explained, the tilt angle of the projection type image display apparatus 1 can be adjusted.

Figure 11A:
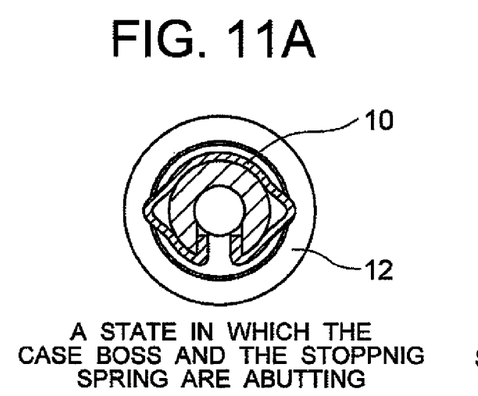
FIG. 11A to FIG. 11D are enlarged views of a latching spring portion according to Embodiment 2.
Figure 11B:
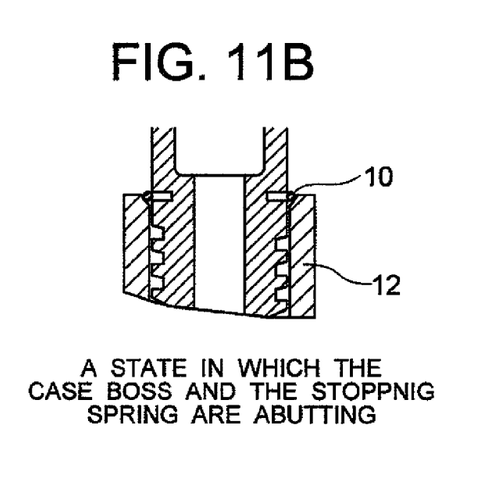
Figure 11C:
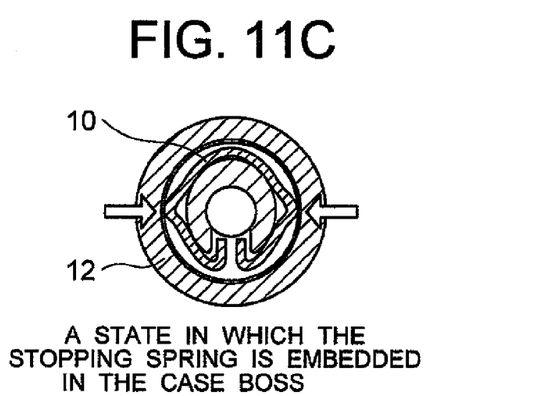
Figure 11D:
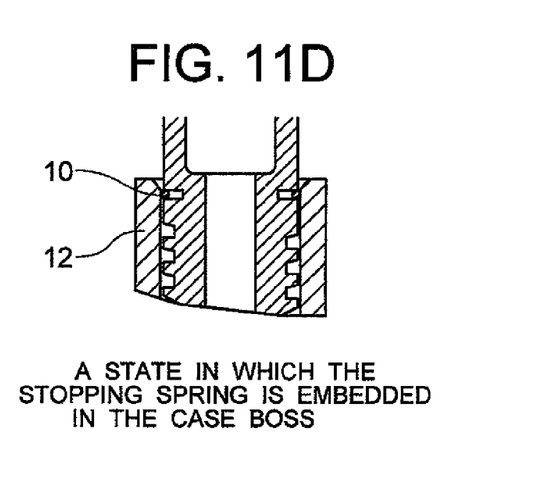

Next, it will be described a state that the extension of the adjustment leg 4 is adjusted finely under the situation of FIG. 10 (namely, adjustment leg 4 is extended) with reference to FIG. 11A to FIG. 11D. FIG. 11A is a sectional view for showing the adjustment leg 4 in a state "A", taken along a direction perpendicular to the longitudinal axial direction of the adjustment leg 4; FIG. 11B is a sectional view for indicating the adjustment leg 4 in the state "A", taken along the longitudinal axial direction of the adjustment leg 4; FIG. 11C is a sectional view for showing the adjustment leg 4 in a state "B", taken along a direction perpendicular to the longitudinal axial direction of the adjustment leg 4; and FIG. 11D is a sectional view for indicating the adjustment leg 4 in the state "B", taken along the longitudinal axial direction of the adjustment leg 4. As indicated in FIG. 11A and FIG. 11C, the stopping spring 10 has a C-shaped form along a vertical direction with respect to the axial direction, and is fitted to a stopping spring groove formed in the end portion of the shaft portion 9. Precisely speaking, as represented in FIG. 11A and FIG. 11B, in the stopping spring 10, two points in the C-shaped form, which are positioned symmetrical with respect to the shaft portion 9, are formed in such a manner that a distance between these two points becomes longer than a diameter of the shaft portion 9, and the two points of this stopping spring 10 abut against the case boss portion 12, so that sliding of the adjustment leg 4 caused by the self-weight is stopped. Other portions of the stopping spring 10 are made smaller than the diameter of the shaft portion 9, and are fitted to the stopping spring groove in such a manner that other portions are embedded in the stopping spring groove.

FIG. 11C and FIG. 11D represent such a situation of the stopping spring 10 when the adjustment leg 4 is adjusted finely mode after the adjustment leg 4 was extended up to the stopping spring 10. As represented in FIG. 11A and FIG. 11B, the major portion of the stopping spring 10 is embedded into the stopping spring groove formed in the end portion of the shaft portion 9, so that a screw thrust caused by screwing the shaft portion 9 is added to the two points of the stopping spring 10 formed in the manner that the distance between the two points becomes longer than the above-described diameter of the shaft portion 9. Since the stopping spring 10 has the C-shaped form, this stopping spring 10 can be deformed in such a manner that an open end thereof is closed, and then, can be entered into a cylinder of the case boss portion 12. In this manner, the portion of the stopping spring 10 latched by the case boss portion 12 is deformed to be entered to the inner side of the case boss portion 12, so that the extension of the adjusting leg 4 can be adjusted finely mode.

In this manner, even in Embodiment 2 in which the shape of the stopping spring 10 is different from that of Embodiment 1, as similar to the above-described Embodiment 1, the adjustment leg 4 which was once latched can be further extended, so that the extension of this adjustment leg 4 can be adjusted finely. More specifically, in Embodiment 2, since the stopping spring 10 is embedded in the stopping spring groove, the thrust resisting force caused by the shaft portion 9 can be made larger than that of Embodiment 1.

Embodiment 3

It will be described a structure capable of achieving a tilt angle of the projection type image display apparatus 1 when the reflection mode is set as another embodiment with reference to FIG. 12 and FIG. 13.

In Embodiment 3, instead of the above-described adjustment legs 4 of Embodiment 1, a tilt angle of the projection type image display apparatus 1 is achieved by tilt leg portions 13 provided on a reflection mirror 3.

Figure 12:
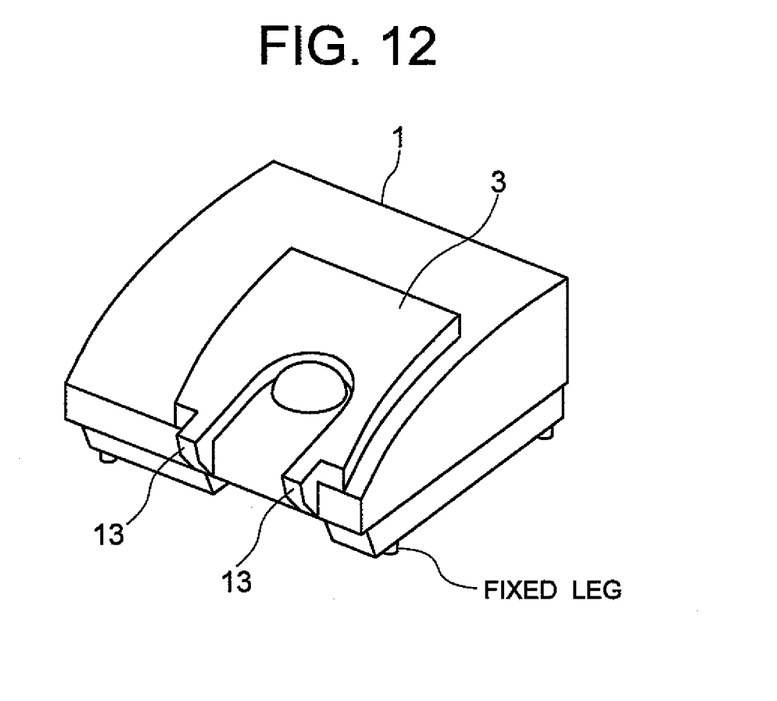
FIG. 12 is a view for illustrating the outline of a projection type image display apparatus according to Embodiment 3 in a direct projection mode.
Figure 13:
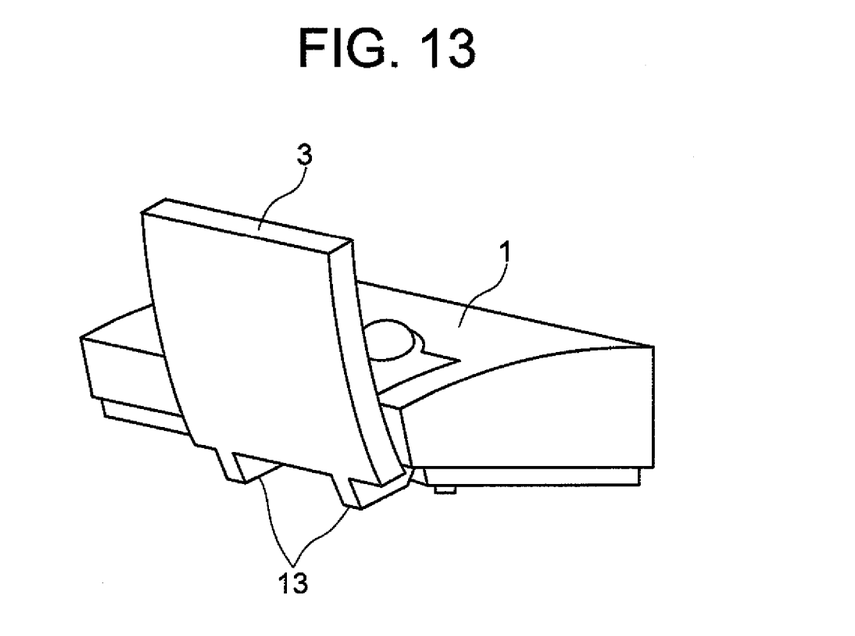
FIG. 13 is a view for illustrating the outline of the projection type image display apparatus of Embodiment 3 when a reflection mirror is stored.

FIG. 12 is a view for showing an outer appearance when the projection type image display apparatus 1 is operated in the direct projection mode. FIG. 13 is a view for indicating an outer appearance when the projection type image display apparatus 1 is operated in the reflection mode. The tilt leg portions 13 capable of achieving the tilt angle of the projection type image display apparatus 1 is provided on the reflection mirror 3. Since, by providing the tilt leg portions 13 on the reflection mirror 3, the projection type image display apparatus 1 can be tilted as interlocked with raising of the reflection mirror 3, operability of the projection type image display apparatus 1 can be improved. It should be understood that the shapes of the tilt leg portions 13 may be properly determined in order to achieve the tilt angle.

Embodiment 4

Figure 14:
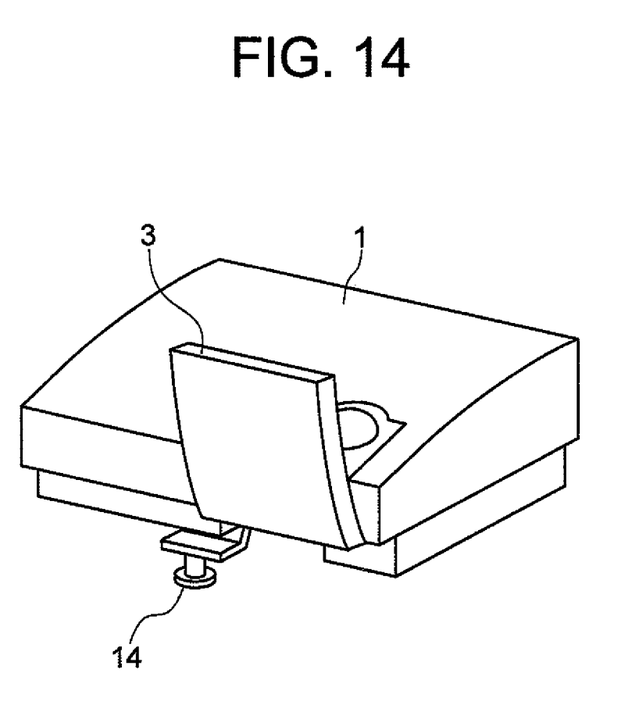
FIG. 14 is a view for illustrating the outline of a projection type image display apparatus according to Embodiment 4.
Figure 15:
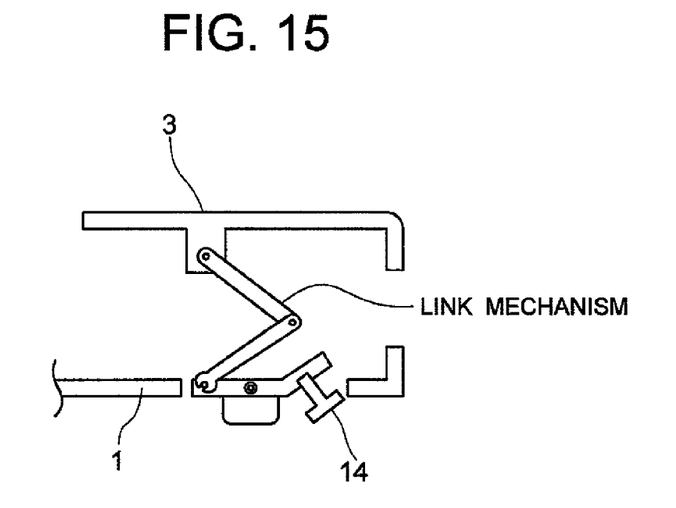
FIG. 15 is a view for illustrating operation of a leg link mechanism of the projection type image display apparatus according to Embodiment 4 when a reflection mirror is stored.
Figure 16:
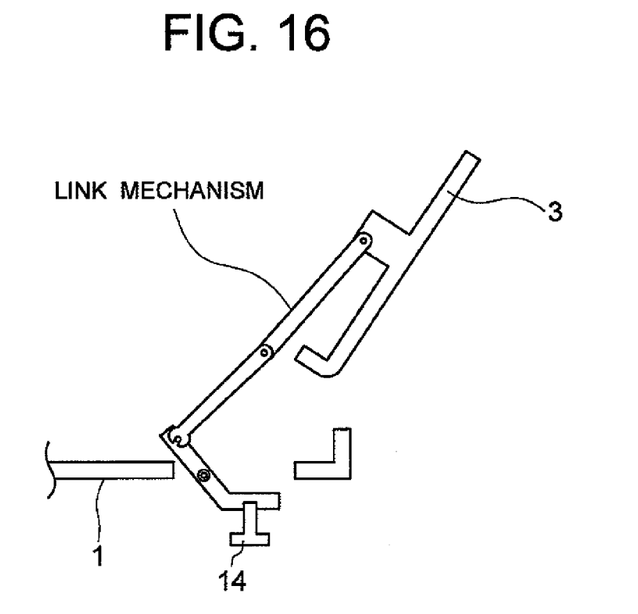
FIG. 16 is a view for illustrating operation of the leg link mechanism of the projection type image display apparatus of Embodiment 4 when the reflection mirror is moved.

A description is made of a structure capable of achieving a tilt angle of the projection type image display apparatus 1 when the reflection mode is set as another embodiment with reference to FIG. 14, FIG. 15, and FIG. 16.

In Embodiment 4, the tilt leg portions 13 of Embodiment 3 are substituted by a storage tilt leg 14 which is interlocked with opening/closing operations of the reflection mirror 3. As shown in FIG. 14, when the reflection mirror 3 is raised, the storage tilt leg 14 is moved so as to tilt the projection type image display apparatus 1 at the tilt angle. FIG. 15 is a sectional view for showing a portion of the projection type image display apparatus 1 when the storage tilt leg 14 is moved. FIG. 16 is a sectional view for indicating a portion of the projection type image display apparatus 1 when the storage tilt leg 14 is moved. The storage tilt leg 14 is stored and moved interlocked with the opening/closing operations of the reflection mirror 3 by a link mechanism shown in FIG. 15 and FIG. 14.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type image display apparatus for projecting optical fluxes from a light source onto a projection plane so as to display thereon a image, wherein said projection type image display apparatus has a direct projection mode for projecting projection light ahead of said projection type image display apparatus and a reflection mode for projecting projection light to a backside of said projection type image display apparatus, comprising:

a reflection mirror arranged in such a manner that said reflection mirror interrupts an optical path of the projection light in said direct projection mode when said reflection mode is set and reflects the projection light to the backside of the projection type image display apparatus, and said projection type image display apparatus is tilted to the backside when said reflection mode is set; and an adjustment leg arranged in a front portion of a bottom plane of said projection type image display apparatus, which is extended to a predetermined leg length, and said projection type image display apparatus is tilted to the backside by extending said adjustment leg;

wherein:
said adjustment leg has a stopping spring at one end portion of a shaft portion having a screw groove;
said stopping spring has a latching portion which is deformed by screwing the shaft portion in a radial direction of said shaft portion;
said adjustment leg is extended in a sliding manner due to self-weight of said adjustment leg, and said latching portion of said stopping spring constitutes a stopper; and
after said latching portion of said stopping spring abuts, said latching portion is deformed in the radial direction of said shaft portion by screwing said shaft portion to cause the stopper to be released, and said sliding of said adjustment leg is adjusted finely by screwing.

2. A projection type image display apparatus according to claim 1, wherein a shape of said stopping spring is of U-shape, leg portions of U-shape are set in a shaft direction of said adjustment leg, and an open end portion of said U-shape stopping spring constitutes the latching portion.

3. A projection type image display apparatus according to claim 1, wherein
said stopping spring has a C-shaped form, two latching points of positions located in an axial symmetrical manner are formed in such a manner that distance between said two latching points is longer than diameter of the shaft portion, and a portion of said stopping spring other than said latching points is fitted to a screw groove of the adjustment leg formed on a shaft peripheral of said adjustment leg in such a manner that said portion of said stopping spring is embedded in said screw groove; and wherein
said two points having the C-shaped form constitute the latching portion, and when said latching points are deformed in the radial direction of said shaft portion, said latching points are deformed in such a manner that open ends of the C-shaped form are closed.

4. A projection type image display apparatus comprising:
a projection lens for projecting projection light produced by modulating light from a light source based upon an image signal onto a screen;
a reflection mirror for reflecting said projection light projected through the projection lens; and
an adjustment leg for tilting said projection type image display apparatus at a predetermined angle in a projection direction, wherein said adjustment leg is extended when the projection light is reflected by said reflection mirror, and is stored when said reflection light is not reflected;
wherein:
said adjustment leg has a stopping spring at one end portion of a shaft portion having a screw groove;
said stopping spring has a latching portion which is deformed by screwing the shaft portion in a radial direction of said shaft portion;
said adjustment leg is extended in a sliding manner due to self-weight of said adjustment leg, and said latching portion of said stopping spring constitutes a stopper; and
after said latching portion of said stopping spring abuts, said latching portion is deformed in the radial direction of said shaft portion by screwing said shaft portion to cause the stopper to be released, and said sliding of said adjustment leg is adjusted finely by screwing.

5. A projection type image display apparatus according to claim 4, wherein said adjustment leg is extended by a predetermined leg length due to self-weight of said adjustment leg, and a leg length of said adjustment leg is adjusted by screwing the adjustment leg.

6. A projection type image display apparatus comprising:
a projection lens for projecting projection light produced by modulating light from a light source based upon an image signal onto a screen;
a reflection mirror for reflecting said projection light projected through the projection lens; and
an adjustment leg for tilting said projection type image display apparatus at a predetermined angle in a projection direction;
wherein said projection lens, said reflection mirror, and said adjustment leg are arranged on the same side of said projection type image display apparatus,
wherein setting directions of said projection type image display apparatus with respect to the screen are opposite between the case that the projection light is directly projected through said projection lens onto the screen and the case that the projection light is projected through the projection lens onto the screen by being reflected by said reflection mirror,
wherein in such a case that the projection light is projected through the projection lens onto the screen by being reflected on the reflection mirror, said projection light passes through an upper area of said projection type image display apparatus to be projected onto the screen;
wherein said adjustment leg has a stopping spring at one end portion of a shaft portion having a screw groove;
wherein said stopping spring has a latching portion which is deformed by screwing the shaft portion in a radial direction of said shaft portion;
wherein said adjustment leg is extended in a sliding manner due to self-weight of said adjustment leg, and said latching portion of said stopping spring constitutes a stopper; and
wherein after said latching portion of said stopping spring abuts, said latching portion is deformed in the radial direction of said shaft portion by screwing said shaft portion to cause the stopper to be released, and said sliding of said adjustment leg is adjusted finely by screwing.

7. A projection type image display apparatus according to claim 6, wherein, in the case that the projection light is projected through said projection lens onto the screen by being reflected on the reflection mirror, said adjustment leg is extended so as to tilt said projection type image display apparatus at a predetermined angle in the projection direction.

* * * * *